United States Patent [19]
Shapira

[11] Patent Number: 6,156,351
[45] Date of Patent: Dec. 5, 2000

[54] EGGS WITH A MIXTURE OF ANTIOXIDANTS AND LOW AMOUNTS OF POLY-UNSATURATED FATTY ACIDS

[76] Inventor: Niva Shapira, 5 Kehilat Zitomir, Neot Afeka, 69405 Tel Aviv, Israel

[21] Appl. No.: 09/043,058

[22] PCT Filed: Sep. 8, 1996

[86] PCT No.: PCT/IL96/00103

§ 371 Date: Mar. 11, 1998

§ 102(e) Date: Mar. 11, 1998

[87] PCT Pub. No.: WO97/11596

PCT Pub. Date: Apr. 3, 1997

[30] Foreign Application Priority Data

Sep. 14, 1995 [IL] Israel ......................................... 115307

[51] Int. Cl.[7] ........................................................ A23L 1/32
[52] U.S. Cl. ............................................... 426/2; 426/614
[58] Field of Search ......................................... 426/614, 2

[56] References Cited

U.S. PATENT DOCUMENTS 5,246,717  9/1993  Garwin .
5,415,879  5/1995  Oh .
5,656,319  8/1997  Barclay ..................................... 426/614
5,759,600  6/1998  Brunnquell ............................... 426/614

FOREIGN PATENT DOCUMENTS

WO 97/11596  4/1997  WIPO .

*Primary Examiner*—Anthony J. Weier

[57] ABSTRACT

Chicken egg containing a synergistic composition of antioxidants and low poly-unsaturated fatty acids (PUFA). The egg includes no more than 15.5% PUFA of the eggs fatty acid and controlled amounts of vitamin E, Iodine, edible carotenoids and additional edible antioxidants. The egg provides an antioxidative environment which reduces the oxidizability of consumer's LDL, which is accepted as a risk factor for cardiovascular diseases The egg is produced by maintaining an egg laying chicken on a regime wherein conventional feed ingredients and supplements are selected to provide about 0.7–1.5 wt. % PUFA of its entire diet, controlled amount of vitamin E, Iodine, edible carotenoids and additional antioxidants.

37 Claims, 2 Drawing Sheets

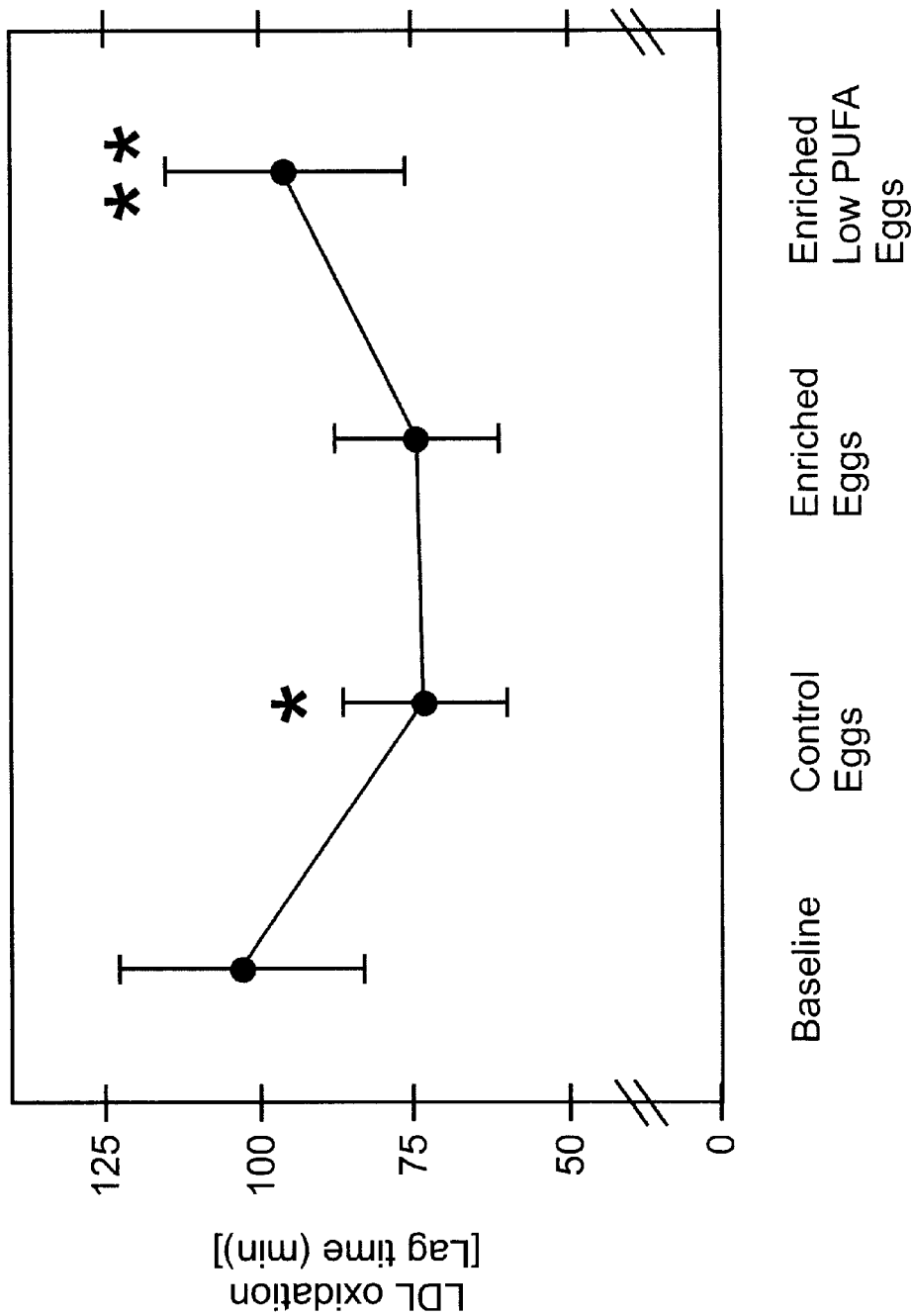

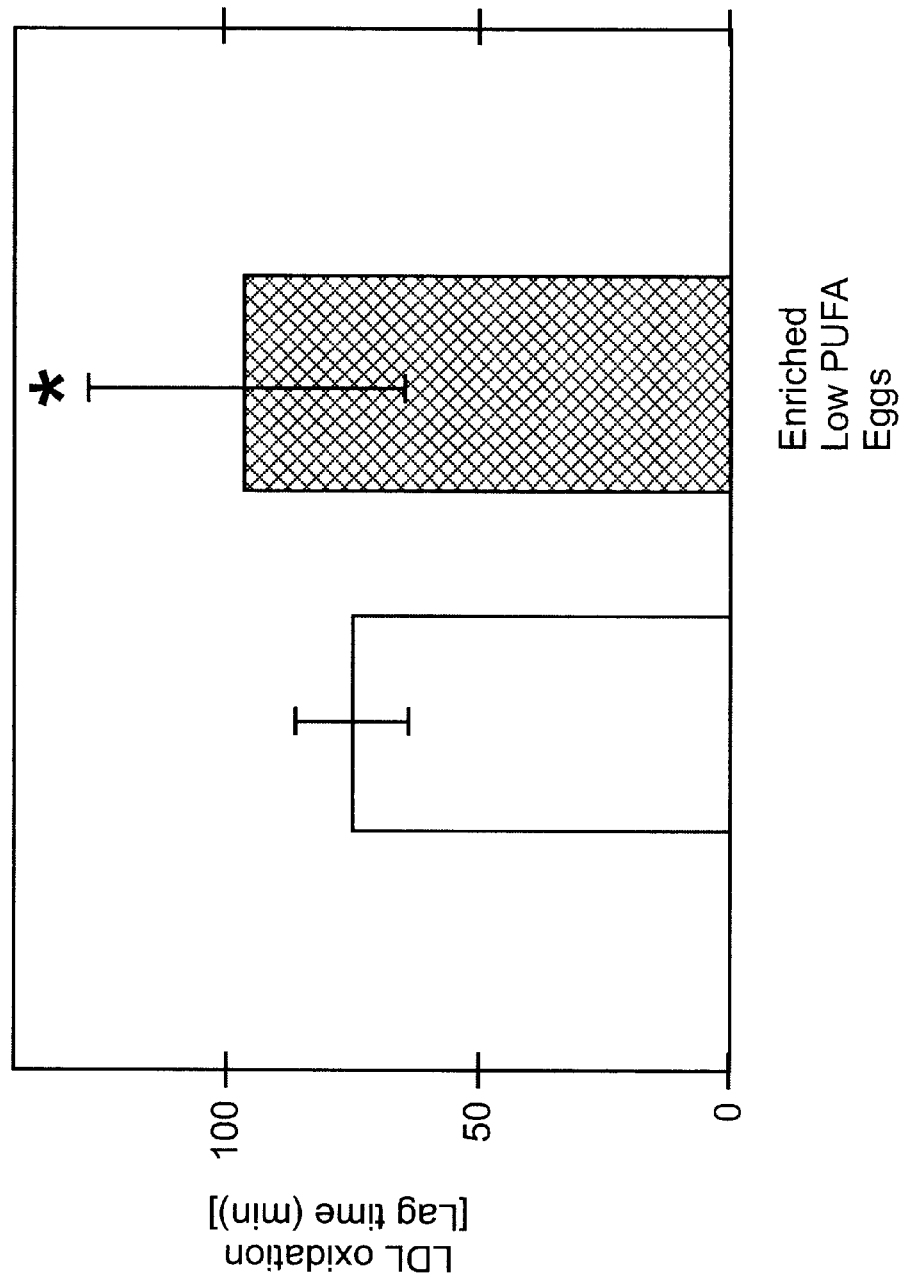

EGGS WITH A MIXTURE OF ANTIOXIDANTS AND LOW AMOUNTS OF POLY-UNSATURATED FATTY ACIDS

FIELD AND BACKGROUND OF THE INVENTION

The present invention relates to eggs comprising a synergistic composition of antioxidants and low amounts of poly-unsaturated fatty acids (PUFA) (hereinafter called "low PUFA") for reducing the oxidation stress of LDL-cholesterol (hereinafter called "LDL"), to a method for their production and to their consumption in human diet designed to reduce the responsive increase of LDL oxidation associated with consumption of prior art eggs which are higher in polyunsaturated fatty acids.

Researchers all over the world proved the link between heart disease and high blood cholesterol, especially high LDL and high LDL/HDL ratio which is accepted as "risk factor".

Early experiments in animals and humans showed that diets comprising large amounts of saturated fatty acids (SFA) and cholesterol increase the risk of high blood cholesterol and cardiovascular (CV) conditions. This lead to the "lipid hypothesis", suggesting that atheroscerosis is caused by hypercholesterolemia-induced deposition of lipids in the vessel wall and to the public recommendation to restrict the cholesterol consumption to 300 mg/day and to reduce the SFA consumption, especially from animal source.

The arithmetic manifestation of this approach is defined by "the cholesterol saturated fat index (CSI) for coronary prevention; background, use and a comprehensive table of foods", Connor et al., J. Am Diet Assoc., 1989, June 89 (69), pp. 807–16. According to this approach low CSI, i.e., food low in SFA and/or cholesterol content, is considered to have a hypocholesterolemic and therefore low atherogenic potential.

As egg yolk contains both 213–240 mg of cholesterol and "animal fat" eggs were among the first food to be excluded from the diet of western countries consumers.

Modifying the egg quality by changing the chicken's diet was challenged by many researchers, trying to invent an egg compatible with low CSI, namely having low cholesterol and low SFA content, in order to prevent the increase of blood cholesterol and SFA in human consumers.

There have been performed many researches in order to produce an egg which would solve the above problem. The results of these researches are described, e.g., in the following Patents: U.S. Pat. No. 4,187,294, U.S. Pat. No. 4,394,376. Ca U.S. Pat. No. 1,115,983, U.S. Pat. No. 4,410,541, U.S. Pat. No. 4,197.293, U.S. Pat. No. 4,197,294, U.S. Pat. No. 4,128,640, U.S. Pat. No. 5,012,761, U.S. Pat. No. 4,738,853, U.S. Pat. No. 4,868,001, U.S. Pat. No. 3,657,423 and U.S. Pat. No. 5,246,717.

These patents substantially describe and claim eggs compatible with a cholesterol-reducing diet and methods of their production. The methods described comprise increasing the iodine and the PUFA content in the chicken's food and therefore of the laid eggs.

In U.S. Pat. No. 5,246,717 it is indicated that for eggs to be compatible with cholesterol reducing diet they should contain not more than 34% of SFA. No differentiation was made between the amounts of the various unsaturated fatty acids, namely between PUFA and mono-unsaturated fatty acids (MUFA) present. Accordingly, the discussion related to chicken feed in U.S. Pat. No. 5,246,717 concerns feed that results in low SFA. No discussion is disclosed in U.S. Pat. No. 5,246,717 concerning feed which results in controlled amounts of PUFA and/or MUFA.

All the above publications relate to the blood cholesterol concentration, which is compatible with the "lipid hypothesis".

However, a paper of Brown et al., J. Am. Diet Assoc. 46, pp. 189–192, 1965, which is mentioned in U.S. Pat. No. 5,246,717 (column 5, lines 62–67) states that: ". . . consumption of modified eggs rich in polyunsaturated fat was ineffective in reducing serum cholesterol . . . ". This means that neither the inventors of the invention described and claimed in U.S. Pat. No. 5,246,717, nor the authors of the publication cited therein were aware of the fact that a large amount of PUFA in the egg may have a bad effect on the blood cholesterol and in particular on the oxidizability of the LDL, as will be shown hereinafter.

It has also recently been found that only those people responding to dietary cholesterol, known as "responders", are sensitive to external/dietary cholesterol. In "non-responders", the external cholesterol consumed operates effectively the feed-back mechanism to keep cholesterol within normal range. This individual variation could explain the contradictory results in studies on the dietary effect on the blood cholesterol concentration.

Another competing hypothesis of atherosclerosis is the "response to injury hypothesis". This explains the first phase, the initiation of the atherogenic process. Much evidence suggest that lipid oxidized products (LOPS) obtained either as a result of a diet or formed in vivo both initiate and promote the process, i.e., cholesterol oxidized products (COPS) and/or oxidized LDL are move atherogenic than the non-oxidized form. Thus, low rancidity, un-oxidized lipids and a large amount of antioxidants reduce the production of lipids and of LDL oxidation. Here PUFA due to its great reactivity to oxidation differs greatly from MUFA which is rather resistant.

As easily can be understood from the above, although there exists a wide agreement that the LDL oxidation in the blood is a major risk for arteriosclerosis, so for no research regarding the correlation between eating eggs and the sensitivity of LDL to oxidation has been performed.

However, a large amount of resources have been spent on fining a correlation between the oxidation of LDL to arteriosclerosis and the reasons causing said oxidation and methods of preventing same. This can be seen, e.g., in the following publications:

1. "Low density lipoprotein rich in oleic acid is protected against oxidative modification: Implications for dietary prevention of atherosclerosis" Sampath Parthasarthy et al. Proc. Nat. Acad. Sci. USA; Vol. 87 pp. 3894–3898, May 1990 Medical Sciences.
2. "Inverse correlation between plasma vitamin E and morality from ischemic heart disease in cross-cultural epidemiology" K. Fred Gey et al., Am. J. Clin. Nutr. 1991; 53:626S-34S. 1991 USA.
3. "Antioxidant Vitamins and Low-density Lipoprotein Oxidation" Abbey, M., Nestel, P. J. Et al; Am. J. Clin. Nutr. 58:525–532, 1993, USA.
4. "Comparative Study on the Effect of Low-Dose Vitamin E and Probucol on the Susceptibility of LDL to Oxidation and the Progression of Atherosclerosis in Watanabe Heritable Hyperlipidemic Rabbits", Kleinveld, et al; Arterioscler. Thromb. 14:1386–1391, 1994.
5. "Increase ion Oxidation Resistance of Atherogenic Serum Lipoproteins Following Antioxidant Supplementation: A Randomized Double Blind Placebo-Controlled Clinical Trial" Nyyssonen, K., et al. EUR. J. Clin. Nutr. 13, 1994.
6. "The Effect of Alpha-tocopherol Supplementation on LDL Oxidation" Jialal, I., et al. Arterioscler. Thromb. Vasc. Biol. 15:190–198, 1995.
7. "Dietary Supplementation with Vitamins C and E inhibits in Vitro Oxidation of Lipoproteins" Rifici, V. A. et al., J. AM. Coll. Nutr. 12:631–637, 1993.
8. "Vitamin E consumption and the Risk Coronary heart Disease in Men" Rimm, EE. B. New Engl. J. Med. 328:1450–1456, 1993.
9. "Antioxidant Vitamins and Coronary Heart Disease" The New England Journal of Medicine Val. 323, pp. 1487–1489, 1993.
10. "Antioxidant-Mediated Inhibition of Macrophage Modification of low density Lipoprotein" Life Chemistry Reports, 1994, Vol. 12, pp. 69–78.

None of these publications has examined the effect of egg PUFA on plasma LDL. The publication of Parthasarathy et al., which was performed with a special sunflower oil (Trisun 80) comprising a low amount of PUFA (8% of lineolic acid) shows that due to this fact inhibition of LDL oxidation is achieved. However, as is readily understood, an experiment performed with oil in feeding rabbits cannot be conclusive for the production of a functional egg.

Moreover, in these publications there is no indication given whatsoever that the addition of carotenoids and of other antioxidants would increase resistance of the LDL against oxidation.

As is well known in the nutrition science in each condition and diet each factor has to be considered on its own merits.

As cholesterol is very reactive to oxidation and as peroxidation is a chain reaction, a lower amount of antioxidative materials are required for protecting the cholesterol at the initial phases than later on. It could therefore be expected ingesting "Protected" cholesterol, namely cholesterol in an environment of low oxidative stress, e.g., comprising a large amount of high antioxidants and low PUFA, which may become "Pro-oxidants", could give a significant impact in the plasma LDL oxidizibility.

Thus, an egg enriched with antioxidants, known for the LDL protection potential and low PUFA can provide such "protecting" environment.

Indeed some research papers show that the reactivity of LDL to oxidation is determined not only by its antioxidant content but also by other compositional factors and more specifically by the ratio of oleic acid content to linoleic acid content (See: oxidation resistance, oxidation rate and extent of oxidation of human low density lipoprotein depend on the ratio of oleic acid content to linoleic acid content: studies in vitamin E deficient subjects; Kleinveld et al.; Free radic. med. 1993 SIP 15 (3) 273–80).

Although chicken diet may greatly affect the fatty acid profile of the eggs, the question is how much this can influence the LDL in the consumer. It was shown that when primates on high cholesterol diet received various amounts of FA, that the FA profile in LDL was indeed influenced by the diet but linoleic acid was the predominant PUFA in all of the LDLs. The rates of LDL oxidation were linearly dependent upon the concentration of PUFA.

The final proof that PUFA and mainly linoleic acid are involved in LDL oxidation was recently shown by the analysis of the lipid oxidation products in the oxidized LDL following immunological activation of the human monocytes: the major FA oxidation product was esterified hydroperoxyoctadecadienoic acid (HPODE) which is the oxidized product of the main PUFA in human LDL-linoleic acid.

It has thus been desirable to devise an egg comprising a synergistic composition of antioxidants preventing the oxidation of LDL. The production of such an egg preferably use as many as possible ingredients of standard chicken mixtures. The method should be simple and should not require many changes by the manufacturer of the mixture or by the farmer growing the chickens.

It is well known that various egg components are affected by the chicken feed, e.g., vitamins E, A and other vitamins. See: Modifying Vitamin Composition of eggs: A review by E. C. Naber. J. Applied poultry res. 2:385–393, 1993.

Recently a paper "α-tocopherol, β-carotene and retinol enrichment of chicken eggs" Jiang, Y. H., et al., Poult SCI, 1994, Jul.:73(7):11137–43, showed that it is possible to enrich these components in the egg significantly. However, supplemental β-Carotene may markedly decrease the yolk deposition of vitamin E. Moreover, β-carotene is most intensively transformed in the chicken to vitamin A and only traces of it attain the yolk compared to the rapid and effective deposition of dietary oxycarotenoids.

The kind and concentration of oxycarotenoids in the yolk is strongly influenced by the diet, i.e., the carotenoid concentration, protective antioxidants, destructive factors, e.g., proxidants such as PUFA, storage and processing conditions, etc. Oxycarotenoids are considered in relation to their pigmentation attributes, since they contribute most of the yolk pigments. β-carotene is thus not the selected antioxidant for chicken feed. Moreover, it is known that oxycarotenoids which are readily deposited in the yolk perform an antioxidative function in the LDL.

In the present invention those principles were applied to obtain an egg comprising more iodine, carotenoids and vitamin E.

A recent research on antioxidants showed that adding vitamin E which increased LDL content 2.5 times the baseline amount, reduced the reactivity of LDL to oxidation by 50%. See: Effect of dietary antioxidant combinations in humans, protection of LDL by vitamin E but not by β-carotene, Reaven et al., 1933, Arterioscler-Thromb Apr. 13(4)590–600.

As in the process of oxidation-protection, vitamin E itself is consumed, and thus its concentration should be increased in proportion to PUFA. The generally accepted ratio being between 0.4–0.6 mg vitamin E/1 gram PUFA.

Moreover, recent research has raised the question regarding the potential of oxidized vitamins (antioxidants) becoming a proxidant and then facilitating oxidation. Thus, it might not be enough to increase the amount of vitamin E but rather provide further protection, e.g. by carotenoids, vitamin C, flavonoids and/or other antioxidants, to create a synergistic effect in antioxidative process.

Vitamin E also protects other antioxidants, e.g., carotenoids. Thus, it enhances pigmentation in the yolk (See: "Oxycarotenoids in Poultry Feeds, Carotenoids as Colorants and Vitamins as Precursor" Marusich and Bauernfeind, Academic Press 1981, pages 319–444). This results in a considerable increase of the xanthophyll concentration in blood plasma (See: Carotens and other Vitamin A Precursors in Animal Feed, Bauernfeind et al., Carontenoids as Colorants and Vitamin A Precursors. Academic Press 1981). Other antioxidants were also effective in the same manner, i.e., ethoxyquin (EMQ) and butylated hydroxytoluene (BHT) are also known to reduce the oxidative destruction of unsaturated molecules such as PUFA and carotenoids, and thus improve pigmentation (see: Carotenoids—their Nature and Significance in Animal Feeds by T. Latsch, Dept. Of Animal Nutrition and Health, HOFFMANN LA ROCHE LTD., BASEL, SWITZERLAND, 1990). The above antioxidants are synthetic compounds and do not have any nutritional value, but they can contribute to reduce the LDL oxidation.

As indicated above, the LDL is usually rich with PUFA which is mainly C-81:2 (linoleic acid) which is very reactive in the oxidation of LDL. On the other hand the presence of a large amount of MUFA, e.g., C-18:1, oleic acid contributes to the increase of the LDL stability as far as oxidation of LDL is concerned. Also SFA are rather resistant to oxidation.

As cam be understood from the above, the PUFA are very sensitive to oxidation and therefore increase the risk to the LDL oxidation. Thus, one major aspect of the present invention is to reduce the amount of the PUFA present in the egg.

SUMMARY OF THE INVENTION

According to the present invention there are provided eggs having a synergistic composition of antioxidants and of poly-unsaturated fatty acids, a method of producing same and the consumption of same in human diet.

According to further features in preferred embodiments of the invention described below, provided is an egg comprising (a) not more than 15.5% poly-unsaturated fatty acids of the egg's fatty acid concentration and not more than 1.5 wt. % of same in the egg; (b) 2–11 mg vitamin E per 59 grams of whole shell egg; per 50 grams of liquid egg; or per 16.6 grams of yolk; (c) 40–112 $\mu$g iodine per 59 grams of whole shell egg; per 50 grams of liquid weight; or per 16.6 of egg yolk; and (d) 10–60 $\mu$g per gram of egg yolk of edible carotenoids which are readily deposited in the yolk.

According to further features in preferred embodiments of the invention described below, provided is an egg comprising (a) not more than 15.5% poly unsaturated fatty acids of the egg's fatty acids concentration; (b) 2–11 mg vitamin E per 59 grams of whole shell egg; (c) 40–112 $\mu$g iodine per 59 grams of whole shell egg; and (d) 10–60 $\mu$g of edible carotenoids per gram of egg yolk.

According to still further feature in the described preferred embodiments the egg further comprising 38–57% mono unsaturated fatty acids of the egg's fatty acid concentration.

According to still further features in the described preferred embodiments the egg further comprising edible antioxidants.

According to still further features in the described preferred embodiments the egg comprising not more than 13% of poly unsaturated fatty acids of the egg's fatty acid concentration.

According to still further features in the described preferred embodiments the egg comprising 2 to 9 mg of vitamin E per 59 grams of whole shell egg.

According to still further features in the described preferred embodiments the egg comprising 4 to 9 mg of vitamin E per 59 grams of whole shell egg.

According to still further features in the described preferred embodiments the carotenoids are oxycarotenoids (xanthophylls) selected from the group consisting of lutein, zeaxanthin, cyptoxanthin, violaxathin, neoxanthin, antheroxanthin and polyoxyxanthophylls.

According to still further features in the described preferred embodiments the source of the xanthophylls is selected from the group consisting of yellow corn, corn gluten meal, lucerne (alfalfa) meal, dehydrated alfalfa meal, seaweed, kelp, marigold meal/concentrate, tagetes meal, and synthetic carotenoids.

According to still further features in the described preferred embodiments the egg comprising not more than twice the amount of antioxidants allowed by the RDA.

According to still further features in the described preferred embodiments the antioxidants are selected from the group consisting of BHT, EMQ, N,N-diphenyl-p-phenylenediamine (DPPD), Ionol, Diludin, Digisan, Tanan, Kurasan, Phenol, Flavonoids, Hydroxyflavone, Galanin, Quercetine, Catechines, Ubiquinol, Selenium, Vitamin C and mixtures of the above.

According to still further features in the described preferred embodiments the source of the fatty acids is selected from the group consisting of raw canola oil. Trisun-80, olive oil, avocado oil, peanut oil, corn oil, soy oil, and combinations thereof.

According to still further features in the described preferred embodiments the source of Vitamin E is selected from the group consisting of alfalfa meal/concentrate, pure vitamin E, salts thereof, and mixtures of the foregoing.

According to still further features in the described preferred embodiments the egg further comprising 50 to 100 $\mu$g of iodine per 59 grams of whole shell egg.

According to still further features in the described preferred embodiments the egg comprising 50–85 $\mu$g of iodine per 59 grams of whole shell egg.

According to still further features in the described preferred embodiments the egg comprising 65 $\mu$g of iodine per 59 grams of whole shell egg.

According to still further features in the described preferred embodiments the source of iodine is selected from the group consisting of seaweed, kelp, calcium iodide, potassium iodide, sodium iodide, cuprous iodide, thymol iodide, ethylene dihydroiodide and combinations thereof.

According to still further features in the described preferred embodiments the egg comprising 20–45 $\mu$g of carotenoids per gram of egg yolk.

According to further features in preferred embodiments of the invention described below, provided is method for producing chicken eggs, the method comprising the step of feeding chickens with standard ingredients and fat, supplemented with from about 0.2 to about 3.0 wt. % edible oil to attain at least 65 wt. % unsaturated fatty acids, the amount of poly-unsaturated fatty acids being about 0.7–1.5 wt. % of the entire diet, further supplemented with iodine and vitamin E, such that the iodine content of the feed is from 2.5 to about 7.5 mg per kg of feed and the vitamin E content of the feed is from about 100 to about 300 mg per kg of feed, and still further supplemented with edible carotenoids such that the carotenoid content of the feed is from 15 to about 45 mg per kg of the feed.

According to still further features in the described preferred embodiments the feed is further supplemented with edible antioxidants so that the antioxidant content of the feed should not exceed the amount of 2 times allowed by the RDA/egg.

According to still further features in the described preferred embodiments the standard grain based food is selected from the group consisting of mil, barley, rye oat, wheat, rice and corn based food mixture.

According to further features in preferred embodiments of the invention described below, eggs according to the present invention are consumed in human diet and are designed to reduce the responsive increase of LDL oxidation associated with consumption of eggs which are higher in polyunsaturated fatty acids.

The present invention successfully addresses the shortcomings of the presently known configurations by providing an egg having a synergistic composition of antioxidants and of poly-unsaturated fatty acids, such that while consuming eggs according to the invention the responsive increase of LDL oxidation associated with consumption of prior art eggs which are higher in polyunsaturated fatty acids is reduced.

BRIEF DESCRIPTION OF THE DRAWINGS

The invention herein described, by way of example only, with reference to the accompanying drawings, wherein:

FIG. 1 shows the effect of control, vitamin E enriched and vitamin E enriched low PUFA two daily eggs on LDL oxidizability; and FIG. 2 shows the effect of vitamin E enriched low PUFA two daily eggs on LDL oxidizability.

DESCRIPTION OF THE PREFERRED EMBODIMENTS

The present invention is of an egg having a synergistic composition of antioxidants and of poly-unsaturated fatty acids, a method of producing same and the consumption of same in human diet.

The egg according to the present invention includes not more than 15.5% PUFA of the egg's fatty acid concentration and/or not more than 1.5 wt. % of same in the egg; 2–11 mg vitamin E per 59 grams of whole shell egg; per 50 grams of liquid egg, or per 16.6 grams of yolk; 40–112 $\mu$g iodine per 59 grams of whole shell egg; per 50 grams of liquid weight; or per 16.6 grams of egg yolk; and 10–60 $\mu$g of edible carotenoids which are generally deposited in the yolk per gram of yolk.

As used herein, "liquid egg" indicates the liquid content of an egg, that is the whole shell egg minus the shell.

The amount of edible carotenoids present in the egg is preferably 20–45 $\mu$g/gram yolk.

Said edible carotenoids may be selected, e.g., among: Carotenoids such as oxycarotenoids (xanthophylls): e.g., lutein, zeaxanthin, cryptoxanthin, violaxanthin, neoxanthin, antheraxanthin, polyoxyxanthophylls, et.

The sources of the xanthophylls may be: yellow corn, corn gluten meal, lucerne (alfalfa) meal, grass meal, dehydrated alfalfa, alfalfa, alfalfa concentrate, grass meal, paprika meal, alga meal, seaweed, kelp marigold meal/concentrate, tagetes meal and/or other suitable synthetic carotenoids such as yellow or red carophyll, etc.

The egg according to the present invention comprises advantageously additional edible antioxidants.

These antioxidants may be selected, e.g., among: synthetic antioxidants which have been found to protect vitamin E, Carotenoids, PUFA, etc., such as BHT, EMW, N,N'-diphenyl-p-phenylenediamine (DPPD), Ionol, Diludin, Digisan, Tana, Kurasan, etc.; Phenolos and Flavonoids from herbs and plants, e.g., sage, Rosemarine, green and block tea, etc.; or pure forms like Hydroxyflavone, Galanin, Quercetine, Catechines, ubiquinol, etc.; Selenium; vitamin C (As Ascorbic Acid or Ascorbyl Esters); mixtures of the above; etc.

All said antioxidants should be within the recommended dietary allowance (RDA) and not exceed twice the amount allowed by RDA in one egg. The amount of the antioxidant differs according to the kind of antioxidant combinations thereof utilized.

Said antioxidants are fed to the chicken as part of the standard mixtures or of water, advantageously as part of a premix.

The fatty acids fed to the chicken usually comprise both PUFA and MUFA. The amount of PUFA in the egg should not exceed the amount indicated above preferable it should not exceed 13%. The amount of MUFA is suitably 38%–57% advantageously 47–53% of the egg's total amount of fatty acids. The remainder are SFA. Animal fats comprise a large amount of SFA which is a disadvantage to the cholesterol metabolism. Thus, as indicated above, animal fat is not the first fat/oil selection of the diet. However, it can be used to be part of the composition and texture of the feed mixture. Plant saturated fat, such as palm oleine can also be used.

The source of the fatty acids is advantageously raw canola oil which is low in PUFA, high in MUFA and very rich in antioxidants. However, any other suitable oil may be used, e.g., Trisun 80; olive oil; avocado oil; peanut oil; corn oil; soy oil; combinations of all said oils; etc.

A preferred egg comprises 2 to 9 mg, advantageously 4 to 9 mg, of vitamin E per 59 grams of whole shell egg; per 50 grams of liquid egg; or per 16.6 grams of egg yolk.

The source of vitamin E is advantageously alfalfa meal/concentrate or pure vitamin E or salts thereof or mixtures of them.

A preferred egg comprises 50 to about 100 $\mu$g, preferably 50–85 $\mu$g, advantageously 65 $\mu$g of iodine, per 59 grams of whole shell egg; per 50 grams of liquid egg of 16.6 grams of egg yolk.

The source of the iodine may be, for example, seaweed e.g., kelp; calcium iodide; potassium iodide; sodium iodide; cuprous iodide; thymol iodide; ethylene dihydroiodide; or combinations thereof.

The present invention consists also in a method for producing chicken eggs (as defined above) which consists in feeding chickens with a standard feed mixture comprising low PUFA supplemented with vitamin E, iodine and carotenoids in amounts ascertaining that the eggs so produced contain the target amounts of said ingredients.

Said ingredients may be part of the standard food mixture; be added as part of a premix, in water or separately.

Should other antioxidants besides carotenoids and vitamin E have to be present they are fed to the chicken in adequate amounts.

The standard grain based food mixture is advantageously a milo, and/or barley, rye oat, wheat, rice corn, etc., based food mixture.

The method according to the present invention preferably comprises feeding chickens with standard ingredients and fat, supplemented with from about 0.2 to about 3.0 wt. % edible oil to attain at least 65 wt. % unsaturated fatty acids, the amount of PUFA being about 0.7–1.5 wt. % of the entire diet, at the utmost 20–45% of the total fatty acids (preferably 35%) further supplemented with iodine and vitamin E, such that the iodine content of the feed is from 2.5 to about 7.5 mg per kg of feed, and the vitamin E content of the feed is from about 100 to about 300 mg per kg of feed, (preferably 100 mg/kg), further supplemented with edible carotenoids such that the carotenoid content of the feed is from 15 to about 45 mg per kg of the feed, and optionally further supplemented with edible antioxidants; the antioxidant content of the egg not exceeding 2 times the amount allowed by RDA/egg.

The present invention will now be illustrated with reference to the following examples, tables and Figures without being limited by same.

The term "Enriched" as used herein refers to diet 2 and/or eggs enriched with vitamin E, Iodine and Carotenoids.

The term "Enriched, low PUFA" a used herein refers to "Enriched" as defined above and comprises low PUFA (diet 3).

EXAMPLE 1

Producing the Eggs

Materials and Methods

One hundred laying pullets (Yarkon, PUB) 4.5 weeks of age, were located in individual battery cages in an open shaded poultry house and divided into two groups.

Diets were formulated (Table 1) and prepared monthly with fresh premixes. Control chickens received the layers Vitamins and Minerals premix of Kofolk Ltd. (Israel). The enriched diet comprised The Biotene Total PX (Eggland's Best) premix having the following composition comprising suitable amounts of:

Rice Hulls, Dehydrated Alfalfa Meal, Rice Bran, Dehydrated Kelp, Vitamin A Supplement, Vitamin D3 Supplement, Vitamin E Supplement, Menadione Sodium Bisulfite Complex, Riboflavin Supplement, d-Calcium Pantothenate, Niacin Supplement, Vitamin B12 Supplement, Pyriodoxine Hydrochloride, Thiamine Mononitrate, Folic Acid, Biotin, Manganese Sulfate, Manganous Oxide, Zinc Sulfate, Zinc Oxide, Iron Sulfate, Copper Sulfate, Sodium Selenite, Sodium Bicarbonate, Propionic Acid, Acetic Acid, Sorbic Acid, Benzoic Acid, Mono and Diesters of 1,2, Propanediol, Hydrated Ammonium Phosphate, Calcium Silicate, Ethoxyquin, Butylated Hydroxyanisole, Disodium EDTA, Phosphoric Acid, Citric Acid, Mono- and Diglycerides.

The control, diet 1 (6% wt.fat) comprised soapstock oil, diet 2 (6% wt.fat) comprised extracted canola oil and diet 3 (3% wt.fat) comprised raw canola oil.

Feed intake, egg production, egg weight, egg composition, and shell quality were determined throughout the experiment. Chemical analyses were performed by Aminolab, Spectrolab, Siap (Israel).

The eggs enriched with vitamin E, iodine and carotenoids; and control eggs were daily collected in an air-conditioned room or refrigerator and were weekly transported to the pool and stored in a refrigerator before they were distributed to volunteers for the clinical study.

During the last feeding month 0.5 ml of Selen Vitamin of Koffolk Ltd. were added to 4 L of the drinking water.

TABLE 1

Composition of Diets

|  | Diet 1 | Diet 2** | Diet 3 |
|---|---|---|---|
| Components (grams/kg) | | | |
| Metabolizable energy (kcal/kg) | 2800 | 2800 | 2800 |
| Protein | 183 | 183 | 180 |
| Arg | 12.4 | 12.4 | 13 |
| Lys | 10.6 | 10.6 | 10.5 |
| Met | 3.9 | 3.9 | 4 |
| Met+Cys | 6.7 | 6.7 | 7.1 |
| Linoleic Acid | 30.5 | 24 | 14 |
| Calcium | 37 | 37 | 38 |
| Available Phosphor | 4 | 4 | 3.1 |
| Fat (%) | 6 | 6 | 3 |
| Ingredients | | | |
| Milo | — | — | 621 |
| Corn | 500 | 500 | — |
| Soybean meal 44 | 310 | 310 | — |
| Soybean meal 48 | — | — | 160 |
| Corn gluten meal | — | — | 70 |

TABLE 1-continued

Composition of Diets

|  | Diet 1 | Diet 2** | Diet 3 |
|---|---|---|---|
| Barley | 30 | 30 | — |
| Wheat Bran | — | — | 27 |
| Soapstock oil | 40 | — | — |
| Canola Oil | — | 40 | 10 |
| Limestone | 86 | 86 | 92 |
| DCP | 16 | 16 | 11 |
| Salt | 3.3 | 3.3 | 3 |
| DL-Methionine | 0.4 | 0.4 | 0.514 |
| Synthetic lysine | — | — | 0.187 |
| Vitamin and mineral premix*** | 10 | 10 | 10 |

**Same composition as diet 1 but soapstock oil was replaced by canola oil.
***In diets 2 and 3 the Biotene Total PX (England's Best) premix was enriched with I and vitamin E. Diet 1 (control) contained a commercial premix of Koffolk Ltd.

Chemical Analyses

The eggs were weighted monthly. The shell was removed with water, dried (100° C. for 1 h) and weighed. Egg freshness was estimated by Hugh units.

Vitamin E, iodine and fatty acids were determined on pooled samples of three eggs per group. Egg vitamin E was determined in HPLC according to J. Food Sci. 1993 (p. 669). Egg iodine was determined according to the Food Chemical Codex method. Egg cholesterol was determined according to the Liebermann-Burchard Reaction. Fatty acid profile in yolks and feeds was determined by gas chromatography after lipid extraction, saponification and methylation.

Statistical analysis were carried out by the statistical software of Excel (Microsoft).

Differences between treatment groups were analyzed by t-test.

Results

Feed intake and production: As shown in Table 2 below, no significant difference between the 3 diets was observed in feed intake, which varied between 113 to 120 grams/hen/day, and the layers performance, indicating that the feed was optimal and balanced. Egg production rate increased with age to 31 weeks of age and stabilized thereafter.

TABLE 2

Egg Production and feed intake of layers on "Enriched" vs. control premix

| Age(wks) | 22 | 27 | 31 | 35 | 39 | 44 |
|---|---|---|---|---|---|---|
| Egg Production (egg/b/d) | | | | | | |
| Control | 0.60 | 0.87 | 0.89 | 0.91 | 0.91 | 0.91 |
| Enriched | 0.76* | 0.87 | 0.91 | 0.88 | 0.93 | 0.90 |
| Feed intake (kg/b/d) | | | | | | |
| Control | — | 0.124 | 0.114 | 0.115 | 0.115 | 0.113 |
| Enriched | — | 0.126 | 0.120 | 0.116 | 0.113 | 0.115 |

|An average of monthly data of 30 to 40 replicates per group
*Statistically significant at $P < 0.05$ Egg weight and its components: As shown in Table 3, below egg weight and its components did not differ between the various diets, but the weight significantly increased with age. Egg weight increased with age, from 58 grams at 27 weeks of age to 65 grams at 39 weeks. Shell weight increased with age from 9 to about 9.45 grams (per 100 grams), with no significant differences between the various treatment groups. The weight of the yolk increased with age mainly after 31 weeks of age. Similar tendency was observed of Hough units.

TABLE 3

Egg weight and components from layers on Enriched and Control regime

| Age (wks) | 22 | 27 | 31 | 35 | 39 |
|---|---|---|---|---|---|
| Egg wt. (grams) | | | | | |
| Control | — | 58.0 | 61.2 | 64.57 | 63.78 |
| Enriched | — | 58.5 | 61.5 | 64.65 | 64.77 |
| Shell wt (%) | | | | | |
| Control | 9.01 | — | 9.11 | — | 9.45 |
| Enriched | 8.76 | — | 9.03 | — | 9.35 |
| Yolk wt. (grams) | | | | | |
| Control | — | 14.2 | 15.3 | — | 16.92 |
| Enriched | — | 13.8 | 15.2 | — | 17.24 |
| Hough units | | | | | |
| Control | — | 5.8 | 6.6 | — | 7.40 |
| Enriched | — | 5.7 | 6.8 | — | 7.56 |

Egg vitamin E and iodine of layers on enriched and control regime: As shown in Table 4, eggs iodine and vitamin E levels were determined several times during the experiment.

TABLE 4

Egg vitamin E and iodine of layers on enriched and control regime

| Age (wks) | 27 | 29 | 31 | 41 |
|---|---|---|---|---|
| Dietary tocopheryl acetate (mg/kg feed) | | | | |
| Control | — | — | 28.6 | — |
| Enriched | — | — | 158.2 | — |
| Egg tocopherol (mg/kg egg) | | | | |
| Control | — | 22.9 | 17.4 | — |
| Enriched | — | 112.7 | 82.5 | 158.3 |
| Egg iodine (µg/grams) | | | | |
| Control | 2.9 | 3.8 | 2 | — |
| Enriched | 3.6 | 7.9 | 5.2 | — |

When measured at 31 weeks of age, dietary vitamin E (tocopheryl acetate) was 5-fold higher in the enriched than in the control groups (159 and 28.6 mg/kg diet, respectively).

The levels in the control eggs ranged between 17 to 23 mg/kg egg, and that of the enriched eggs was about 5–9 fold higher. The highest value 41 weeks were attained under reduced PUFA.

The iodine level increased in the enriched eggs by 2–2.5 fold in comparison with the control eggs (Table 4).

Fatty acid composition in diets and eggs: As shown in Table 5, below, fatty acids profile egg lipids (triglycerides and phospholipides) show (table 5) that polmitic acid (C18:1) and oleic acids (C16:0) are the major fatty acids in eggs and linoleic acid (C18:2) is the third component.

TABLE 5

Fatty acid composition in diets and eggs

| | | | | Enriched II | | Enriched |
|---|---|---|---|---|---|---|
| FA | | Control | Enriched | a | b | Low PUFA |
| In Eggs (%) | | | | | | |
| Lauric | 12:0 | — | — | — | — | — |
| Myristic | 14:0 | 0.3 | 0.3 | 0.5 | 0.7 | 0.4 |
| Palmitic | 16:0 | 30.1 | 29.9 | 25 | 26.1 | 27.2 |
| Palmitoleic | 16:1 | 0.8 | 0.8 | 4.7 | 4.5 | 4.5 |
| Stearic | 18:0 | 10.5 | 10.7 | 4.2 | 4.4 | — |
| Oleic | 18:1 | 37.4 | 34.1 | 37.3 | 37 | 47.3 |
| Linoleic | 18:2 | 17.9 | 21.5 | 21 | 21.6 | 12.4 |
| Linolenic | 18:3 | 0.4 | 0.4 | 2.3 | 1.52 | 0.6 |
| Arachidic | 20:0 | 0.3 | 0.3 | 0.8 | 0.2 | 0.3 |
| Lingoceric | 24:0 | 0.2 | 0.2 | — | 1.14 | 0.8 |
| In Diets (%) | | | | | | |
| | 12:0 | 0.3 | 0.3 | — | — | — |
| | 14:0 | 0.5 | 0.3 | — | — | 0.2 |
| | 16:0 | 12.2 | 8.5 | — | — | 11.2 |
| | 16:1 | 0.4 | 0.1 | — | — | — |
| | 18:0 | 5.9 | 3 | — | — | 1.5 |
| | 18:1 | 30.7 | 37.6 | — | — | 36.9 |
| | 18:2 | 41:1 | 41:1 | — | — | 40.8 |
| | 18:3 | 2.9 | 6.7 | — | — | 4.8 |
| | 20.0 | 1 | 0.2 | — | — | 0.3 |
| | 20:3 | 2.2 | 0.4 | — | — | 0.9 |
| | 20:4 | 1.3 | 1 | — | — | 0.2 |
| | 22:0 | 0.1 | 0.2 | — | — | — |
| | 24:0 | 0.5 | 0.1 | — | — | — |

Due to the dietary fat reduction (wt. %) from 6% (diet 1 and 2) to 3% (diet 3) and in particular the reduction of linoleic acid from 3.05% (diet 1) to 1.44% (diet 3) (see Table 1) the lineolic acid in the egg was reduced from 21 and 21.6% to 12.4% in diets 1,2, and 3, respectively. The oleic acid increase corresponded to the decrease of linoleic acid (Table 5).

EXAMPLE 2

The Clinical Evaluation of the Eggs

The purpose of this experiment was to examine the influence of eating eggs comprising a low amount of linoleic acid and a large amount of antioxidants on the LDL-oxidation.

The research was performed on 17 healthy volunteers, 14 women and 3 men, aged 30 to 50, non-smokers taking no medication and consuming a standard Israeli diet (26% fat, 52% carbohydrates and 21% protein).

Before the beginning of the study the volunteers ate eggs only occasionally. The volunteers were asked to maintain their habitual diet and lifestyle from 2 weeks before and during the 9 weeks of the experiment. Every volunteer went through the following three stages of the experiment:
1. Three weeks with 2 control eggs daily.
2. Three weeks with 2 eggs daily enriched with iodine, vitamin E and carotenoids.
3. Three weeks with 2 eggs daily enriched as in 2+selenium comprising a reduced amount of PUFA.

Blood samples were taken after a fast of 14 hours (of Baseline), thereafter 3, 6, and 9 weeks on the 2 eggs feeding regime and tested for blood chemistry, lipids, vitamin E, carotenoids, cholesterol, and LDL oxidation.

The LDL was separated from the plasma by the density gradient and was oxidized by incubation with copper ions. The oxidation rate of the LDL was determined by the kinetic differences in the formation of coupled diens (at 234 nm) as well as on the basis of the Malon Diadehyde levels in LDL (By the TBARS method).

Results

As shown in Table 6, below, eating 2 control eggs daily for three weeks did not affect significantly blood chemistry but slightly increased glucose and urea (BUN), within the normal range, Enriched eggs significantly reduced gluocose back to the Baseline level.

TABLE 6

Blood chemistry, following eggs consumption (mg/dI)

| Time on Eggs Supplementation | 0 Baseline | 3 Weeks Control eggs | 6 Weeks Enriched | 9 Weeks Enriched Low PUFA |
|---|---|---|---|---|
| CK | 110 ± 30 | 118 ± 33 | 111 ± 45 | 107 ± 32 |
| Amylase (IU/ml) | 53 ± 11 | 50 ± 10 | 50 ± 12 | 55 ± 12 |
| AST (IU/ml) | 19 ± 6 | 22 ± 3 | 18 ± 4 | 18 ± 3 |
| ALT (IU/ml) | 20 ± 10 | 19 ± 9 | 19 ± 11 | 19 ± 10 |
| T.Bilirubin | 0.7 ± 0.2 | 0.6 ± 0.3 | 0.5 ± 0.3 | 0.5 ± 0.2 |
| D.Bilirubin | 0.06 ± 0.02 | 0.05 ± 0.02 | 0.07 ± 0.07 | 0.06 ± 0.1 |
| Calcium | 10 ± 0.4 | 9 ± 0.3 | 10 ± 0.3 | 9.8 ± 0.3 |
| Glucose | 84 ± 8 | 98 ± 8* | 85 ± 7** | 85 ± 7** |
| BUN | 12 ± 4 | 16 ± 2* | 15 ± 4** | 14 ± 4** |
| Createnine | 0.9 ± 0.1 | 0.8 ± 0.2 | 0.9 ± 0.1 | 0.7 ± 0.1 |
| Alkaline Phosphatase | 50 ± 11 | 54 ± 13 | 52 ± 15 | 54 ± 15 |

*p < 0.01 (vs. Baseline).
**p < 0.05 (vs. 3 Weeks control eggs consumption)

As shown in Table 7, below, eating 2 control eggs/day had a negative effect on blood cholesterol. It increased the total cholesterol (TC) and LDL and reduced the HDL-Cholesterol (11%).

TABLE 7

Plasma Lipids and lipoproteins following eggs consumption (mg/dI)

| Time on Eggs Supplementation | 0 Baseline | 3 Weeks Control Eggs | 6 Weeks Enriched | 9 Weeks Enriched, Low PUFA |
|---|---|---|---|---|
| Cholesterol | 185 ± 24 | 210 ± 40* | 220 ± 45 | 202 ± 41 |
| HDL-C | 54 ± 7 | 48 ± 7* | 55 ± 15** | 54 ± 7** |
| LDL-C | 111 ± 20 | 132 ± 23* | 144 ± 20 | 130 ± 21 |
| VLDL-C | 22 ± 10 | 20 ± 10 | 23 ± 10 | 24 ± 9 |
| Apo-A-1 | 143 ± 20 | 148 ± 14 | 146 ± 25 | 142 ± 19 |
| Apo-B-100 | 90 ± 19 | 91 ± 20 | 98 ± 12 | 107 ± 27 |
| Triglycerids | 110 ± 44 | 101 ± 40 | 116 ± 38 | 115 ± 39 |

*p < 0.01 (vs. Baseline).
**p < 0.05 (vs. 3 Weeks control eggs consumption)

Thus is increased significantly the risk factor (LDL/HDL) for atheroselerosis. Enriched eggs significantly increased the HDL back to the baseline level, thus, reducing the risk factor, although it did not reduce the LDL level.

Table 8, below, shows a highly significant effect of the enriched eggs on the plasma antioxidants. Compared to the baseline and after 3 weeks levels, the vitamin E, vitamin A and carotenoids increased (average of results after 6 and 9 weeks) by 34%, 26.5% and 49%, respectively. These results indicate that enriching the eggs did reduce the oxidative stress which is expected to protect against the harmful effect of LDL oxidation.

TABLE 8

Plasma Vitamins E, A and Carotenoids following eggs consumption (mg/dI)

| Time on Eggs Supplement | 0 Baseline | 3 Weeks Control Eggs | 6 Weeks Enriched | 9 Weeks Enriched Low PUFA |
|---|---|---|---|---|
| Vitamin E | 43 ± 6 | 44 ± 8 | 63 ± 17* | 54 ± 11* |
| Vitamin A | 0.55 ± 0.11 | 0.58 ± 0.13 | 0.77 ± 0.18* | 0.66 ± 0.21* |
| Carotenoids | 1.11 ± 0.21 | 1.09 ± 2.27 | 1.60 ± 0.57* | 1.69 ± 0.45* |

*p < 0.01 (vs. 3 Weeks)

The analysis of plasma FA, as shown in Table 9, below does not reveal any significant trend. As the volunteers are under "free living" conditions, the eggs does not seem to be a major source of FA in the diet and thus it is not expected that they affect significantly the blood levels.

TABLE 9

Plasma fatty acids following eggs consumption (%)

| Time on Eggs Supplementation | 0 Baseline | 3 Weeks Control Eggs | 6 Weeks Enriched | 9 Weeks Enriched Low PUFA |
|---|---|---|---|---|
| 16:0 (Palmitic) | 19 ± 2 | 21 ± 3 | 20 ± 2 | 19 ± 1 |
| 18:0 (Stearic) | 8 ± 1 | 10 ± 1 | 10 ± 2 | 8 ± 2 |
| 18:1 (Oleic) | 11 ± 2 | 12 ± 2 | 9 ± 2 | 16 ± 3*** |
| 18:2 (Linoleic) | 29 ± 4 | 20 ± 5* | 25 ± 5** | 24 ± 5 |
| 20:4 (Archidonix) | 10 ± 2 | 10 ± 3 | 11 ± 2 | 9 ± 2 |
| Other Fatty Acids | 23 | 28 | 25 | 24 |

*p < 0.01 (vs. Baseline).
**p0.05 (vs. 3 Weeks).
***p0.01 (vs. 6 Weeks)

The main purpose of the research to evaluate the potential of eggs to reduce the oxidizability of plasma LDL, was achieved by the regime maintain between 6–9 weeks (see FIGS. 1 and 2).

As can be seen, eating 2 control eggs significantly increased the oxidizability of plasma-LDL. Enriching with iodine, vitamin E and carotenoids was not enough to restore the protection on LDL, unless the PUFA percentage was reduced in the feed and the eggs.

On this regime the plasma level of antioxidants (Table 8) i.e., vitamins E, A and carotenoids were increased by 23%, 14% and 55%, respectively. This emphasizes the potential contribution of each of the antioxidants and the synergistic effect attained by the eggs in diet 3.

The following examples represent low PUFA feed mixtures. The enrichment with iodine, vitamin E and carotenoids should preferably be formulated and based on the calculations of the ingredients in the premix. Special Attention should be given to milo based low corn mixtures which comprise low PUFA but may be low in the amount of carotenoids present, e.g., Example 4, which comprises a low amount of carotenoids in the feed ingredients (compared with Example 3 which comprises at least 30 mg of carotenoids in the ingredients of 1 kg of feed). The mixture of Example 4 should thus advantageously by further supplement with other sources of carotenoids, e.g., corn gluten meal, alfalfa, grass, algae, tagetes meals or extracts and/or with carotenoid premixes, e.g., oroglo layer pig well egg of Sun Gold and/or other synthetic carotenoids, et.

EXAMPLE 3
Ingredients (KG unless otherwise indicated) in 1000 KG feed
- Corn 400
- Raw Canola oil 5
- D1 Methionine 89 grams
- Limestone 99
- Di Calcium Phosphate 6.7
- Salt 2.7
- $Na_2SO_4$ 1
- Soya 48% protein 82
- Corn Gluten 60 % protein 49
- Barley Meal 48
- Chopped Corn 182
- Sun flower Meal 100
- Canola Meal 21

Layer Mix 3
- Fat Percentage 3%

EXAMPLE 4
Ingredients (KG) in 1000 KG feed
- Milo 613
- Raw Canola/Chicken Fat 8.2
- D1 Methionine 0.3
- Lime Stone 92
- DCP 6.2
- Salt
- $Na_2SO_4$ 1
- Soya 48% protein 121
- Corn Gluten 60% protein 19
- Barley 16
- Chop Corn 10
- Sunflower 100
- Canola Meal 8.5

Layer Mix 4
- Fat Content 2.9
- 2700 Kcal/17% Protein

EXAMPLE 5
Ingredients (KG) in 1000 KG feed
- Mila 510.5
- Corn 100
- Soya 44% protein 174.9
- Corn Gluten 70
- Remoulage 26.6
- M.H.A 0.5
- D.C.P 12
- Lime stone 91
- Lysine 0.05
- Canola oil 7
- Salt 3

Layer Mix 5
- metabolic energy 2769 Kcal
- Fat 2.87%
- Linoleic acid 1.14%
- Protein 17.5%

EXAMPLE 6
Ingredients (KG) in 1000 KG feed
- Milo 621
- Soya 48% protein 160
- Bran 27
- Corn Gluten 70
- M.H.A 0.5
- D.C.P 11
- Lime Stone 92
- Lysine 0.2
- Canola Oil 20
- Salt 3

Layer Mix 6
- Metabolic energy 2779 Kcal
- Fat 3.14%
- Linoleic 1.13%
- Protein 17.7

EXAMPLE 7
Ingredients (KG) in 1000 KG feed
- Milo 633.8
- Soya 44% protein 174.6
- Corn Gluten 70
- M.H.A 0.5
- D.C.P 123
- Limestone 90.7
- Lysine 3.2
- Canola oil 7
- Salt 3

Layer Mix 7
- Metabolic energy 27809 Kcal
- Fat 2.79%
- Linoleic 1.03%
- protein 17.5%

EXAMPLE 8
Ingredients (KG unless otherwise indicated) in 1000 KG feed
- Milo 533
- Barley 100
- Soya 44% protein 143
- Corn Gluten 70
- M.H.A. 0.8
- D.C.P. 12.1
- Lime Stone 90.0
- Lysine 15.9
- Canola oil 7
- Salt 3

Layer Mix 8
- Metabolic energy 2760 Kcal
- Fat 2.7%
- Linoleic 1%
- Protein 17.5%

What is claimed is:

1. An egg comprising:
   (a) not more than 15.5% poly unsaturated fatty acids of the egg's fatty acids concentration;
   (b) 2–11 mg vitamin E per 59 grams of whole shell egg; and
   (c) 10–60 µg of edible carotenoids per gram of egg yolk.

2. An egg according to claim 1, further comprising 38.57% mono unsaturated fatty acids of the egg's fatty acid concentration.

3. An egg according to claim 1, further comprising edible antioxidants.

4. An egg according to claim 1, comprising not more than 13% of poly unsaturated fatty acids.

5. An egg according to claim 1, comprising 2 to 9 mg of vitamin E per 59 grams of whole shell egg.

6. An egg according to claim 5, comprising 4 to 9 mg of vitamin E per 59 grams of whole shell egg.

7. An egg according to claim 1, wherein said carotenoids are oxycarotenoids selected from the group consisting of lutein, zeaxanthin, cryptoxanthin, violaxanthin, neoxanthin, antheraxanthin and polyoxyxanthophylls.

8. An egg according to claim 7, wherein the source of the xanthophylls is selected from the group consisting of yellow corn, corn gluten mean, lucerne meal, dehydrated alfalfa meal, seaweed, kelp, marigold meal/concentrate, tagetes meal, and synthetic carotenoids.

9. An egg according to claim 3, wherein said antioxidants are selected from the group consisting of BHT, EMQ, N,N-diphenyl-p-phenylenediamine (DPPD), Ionol, Diludin, Digisan, Tanan, Kurasan, Phenols, Flavonoids, Hydroxyflavone, Galanin, Quercetine, Catechines, Ubiquinol, Selenium, Vitamin C and mixtures of BHT, EMQ, N,N-diphenyl-p-phenylenediamine (DPPD), Ionol, Diludin, Digisan, Tanan, Kurasan, Phenols, Flavonoids, Hydroxyflavone, Galanin, Quercetine, Catechines, Ubiquinol, Selenium and Vitamin C.

10. An egg according to claim 1, wherein the source of the fatty acids is selected from the group consisting of raw canola oil, Trisun-80, olive oil, avocado oil, peanut oil, corn oil, soy oil, and combination thereof.

11. An egg according to claim 1, wherein the source of Vitamin E is selected from the group consisting of alfalfa meal/concentrate, pure vitamin E, salts of vitamin E, and mixtures of alfalfa meal/concentrate, pure vitamin E and salts of vitamin E.

12. An egg according to claim 1, further comprising:
   (d) 40–112 μg iodine per 59 grams of whole shell egg.

13. An egg according to claim 12, comprising 50 to 100 μg of iodine per 59 grams of whole shell egg.

14. An egg according to claim 13, comprising 50–85 μg of iodine per 59 grams of whole shell egg.

15. An egg according to claim 13, comprising 65 μg of iodine per 59 grams of whole shell egg.

16. An egg according to claim 13, wherein the source of iodine is selected from the group consisting of seaweed, kelp, calcium iodide, potassium iodide, sodium iodide, cuprous iodide, thymol iodide, ethylene dihydroiodide and combinations thereof.

17. An egg according to claim 1, comprising 20–45 μg of carotenoids per gram of egg yolk.

18. A method for producing chicken eggs, the method comprising the step of feeding chickens with standard ingredients and fat, supplemented with from about 0.2 to about 3.0 wt. % edible oil to attain at least 65 wt % unsaturated fatty acids, the amount of poly-unsaturated fatty acids being about 0.7–1.5 wt. % of a diet of the chickens, further supplemented vitamin E, such that the vitamin E content of the feed is from about 100 to about 300 mg per kg of feed, and still further supplemented with edible carotenoids such that the carotenoid content of the feed is from 15 to about 45 mg per kg of the feed.

19. A method according to claim 18, wherein the feed is further supplemented with iodine, the iodine content of the feed is from 2.5 to about 7.5 mg per kg of feed.

20. A method according to claim 18, wherein the standard ingredients are in a form of a feed mixture selected from the group consisting of milo based feed mixture, barley based feed mixture, rye oat based feed mixture, wheat based feed mixture, rice based feed mixture and corn based feed mixture.

21. A method of consuming eggs in a human diet, the method being designed to reduce a responsive increases of LDL oxidation associated with consuming conventional eggs which are higher in polyunsaturated fatty acids, the method comprising the step of consuming, in a human diet, eggs, wherein each egg of said eggs comprises:
   (a) not more than 15.5% poly unsaturated fatty acids of the egg's fatty acids concentration;
   (b) 2–11 mg vitamin E per 59 grams of whole shell egg; and
   (c) 10–60 μg of edible carotenoids per gram of egg yolk.

22. The method of claim 21, wherein each egg further comprises 38–57% more unsaturated fatty acids of the egg's fatty acid concentration.

23. The method of claim 21, wherein each egg further comprises edible antioxidants.

24. The method of claim 21, wherein each egg comprises not more than 13% of poly unsaturated fatty acids of the egg's fatty acid concentration.

25. The method of claim 21, wherein each egg comprises 2 to 9 mg of vitamin E per 59 grams of whole shell egg.

26. The method of claim 25, wherein each egg comprises 4 to 9 mg of vitamin E per 59 grams of whole shell egg.

27. The method of claim 21, wherein said carotenoids are oxycarotenoids selected from the group consisting of lutein, zeaxanthin, cryptoxanthin, violaxanthin, neoxanthin, antheraxanthin and polyoxyxanthophylls.

28. The method of claim 27, wherein the source of the xanthophylls is selected from the group consisting of yellow corn, corn gluten meal, lucerne meal, dehydrated alfalfa meal, seaweed, kelp, marigold meal/concentrate, tagetes meal, and synthetic carotenoids.

29. The method of claim 23, wherein said antioxidants are selected from the group consisting of BHT, EMQ, N,N-diphenyl-p-phenylenediamine (DPPD), Ionol, Diludin, Digisan, Tanan, Kurasan, Phenols, Flavonoids, Hydroxyflavone, Galanin, Quercetine, Catechines, Ubiquinol, Selenium, Vitamin C and mixtures of BHT, EMQ, N,N-diphenyl-p-phenylenediamine (DPPD), Ionol, Diludin, Digisan, Tanan, Kurasan, Phenols, Flavonoids, Hydroxyflavone, Galanin, Quercetine, Catechines, Ubiquinol, Selenium and Vitamin C.

30. The method of claim 21, wherein the source of the fatty acids is selected from the group consisting of raw canola oil, Trisun-80, olive oil, avocado oil, peanut oil, corn oil, soy oil, and combinations thereof.

31. The method of claim 21, wherein the source of Vitamin E is selected from the group consisting of alfalfa meal/concentrate, pure vitamin E, salts of vitamin E, and mixtures of alfalfa meal/concentrate, pure vitamin E and salts of vitamin E.

32. The method of claim 21, wherein each egg further comprises:
   (c) 40–112 μg iodine per 59 grams of whole shell egg.

33. The method of claim 32, wherein each egg further comprises 50 to 100 μg of iodine per 59 grams of whole shell egg.

34. The method of claim 33, wherein each egg comprises 50–85 μg of iodine per 59 grams of whole shell egg.

35. The method of claim 33, wherein each egg comprises 65 μg of iodine per 59 grams of whole shell egg.

36. The method of claim 33, wherein the source of iodine is selected from the group consisting of seaweed, kelp, calcium iodide, potassium iodide, sodium iodide, cuprous iodide, thymol iodide, ethylene dihydroiodide and combinations thereof.

37. The method of claim 21, wherein each egg comprises 20–45 μg of carotenoids per gram of egg yolk.

* * * * *